J. W. GAMBLE.
TANK CONSTRUCTION.
APPLICATION FILED MAR. 19, 1912.
1,127,226.
Patented Feb. 2, 1915.
5 SHEETS—SHEET 1.
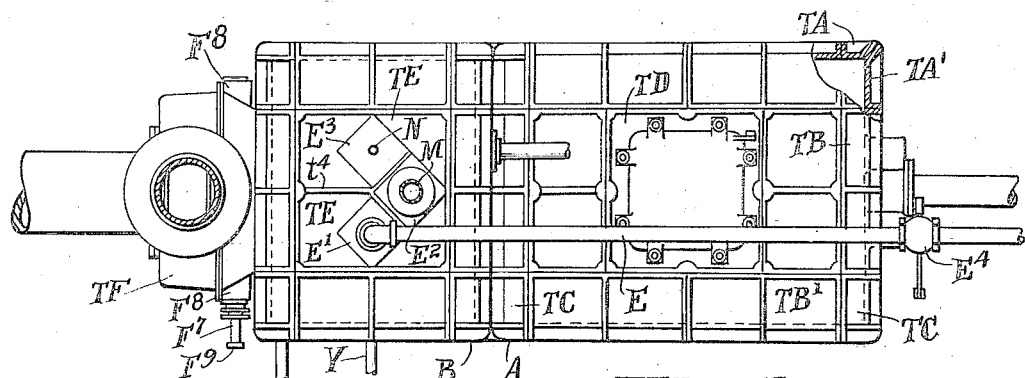
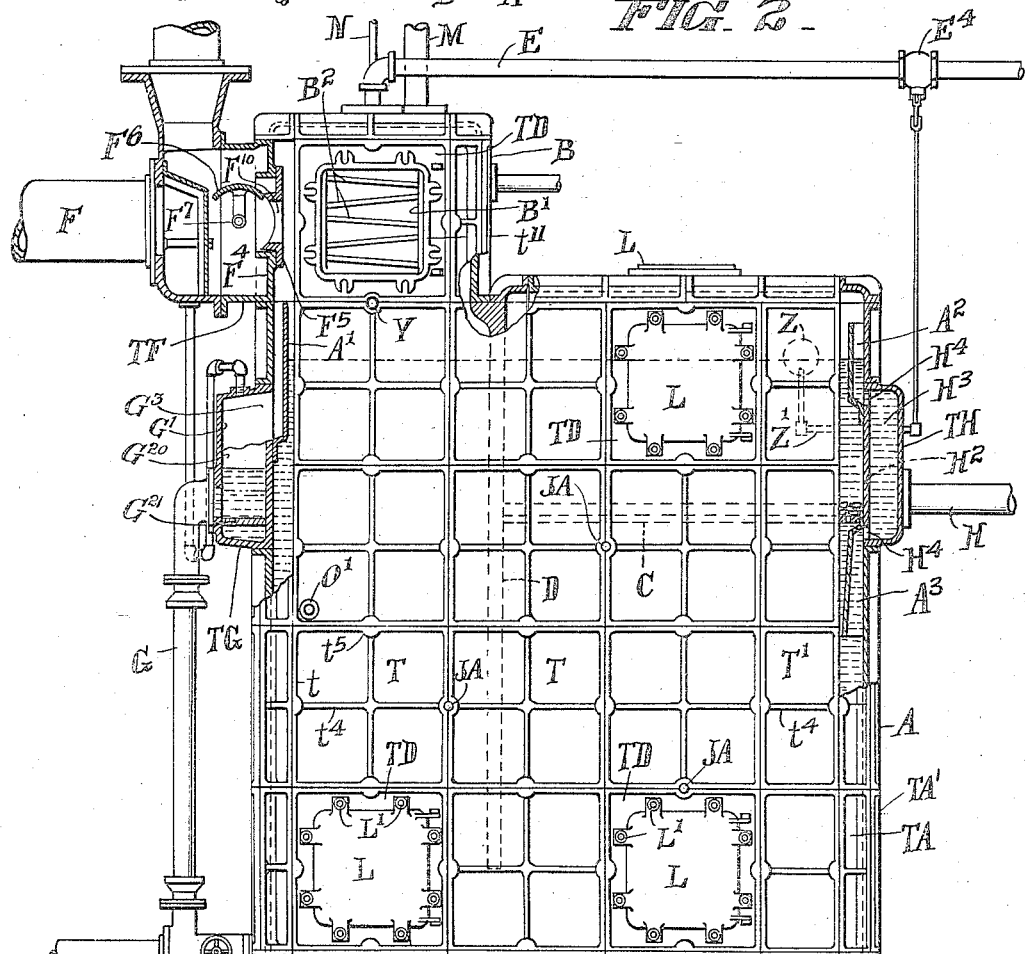

J. W. GAMBLE.
TANK CONSTRUCTION.
APPLICATION FILED MAR. 19, 1912.
1,127,226.
Patented Feb. 2, 1915.
5 SHEETS—SHEET 2.
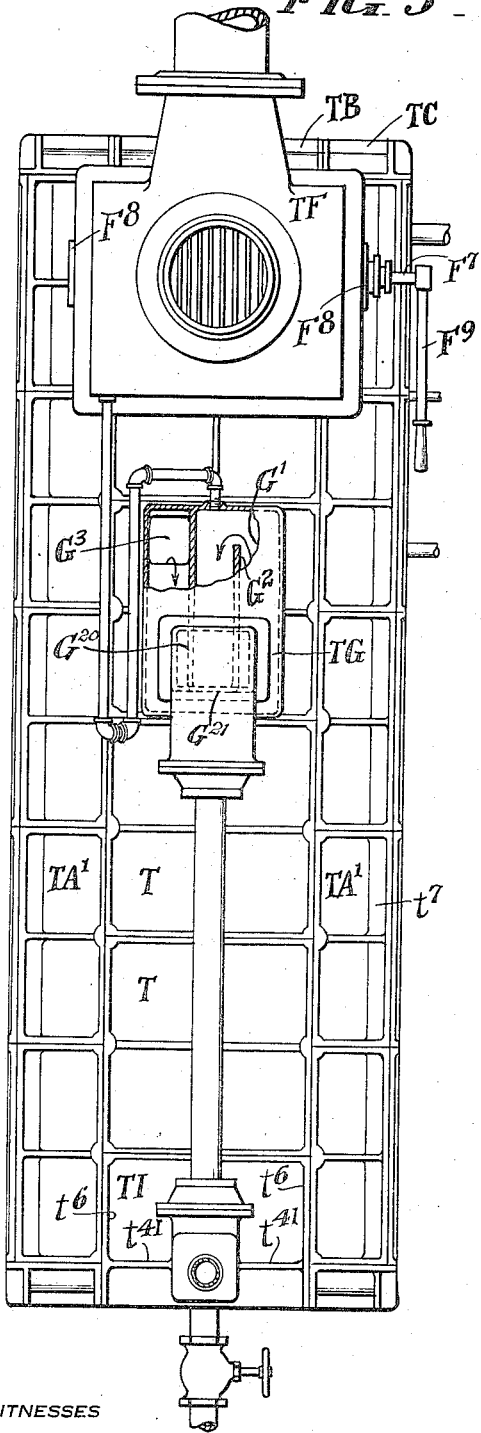
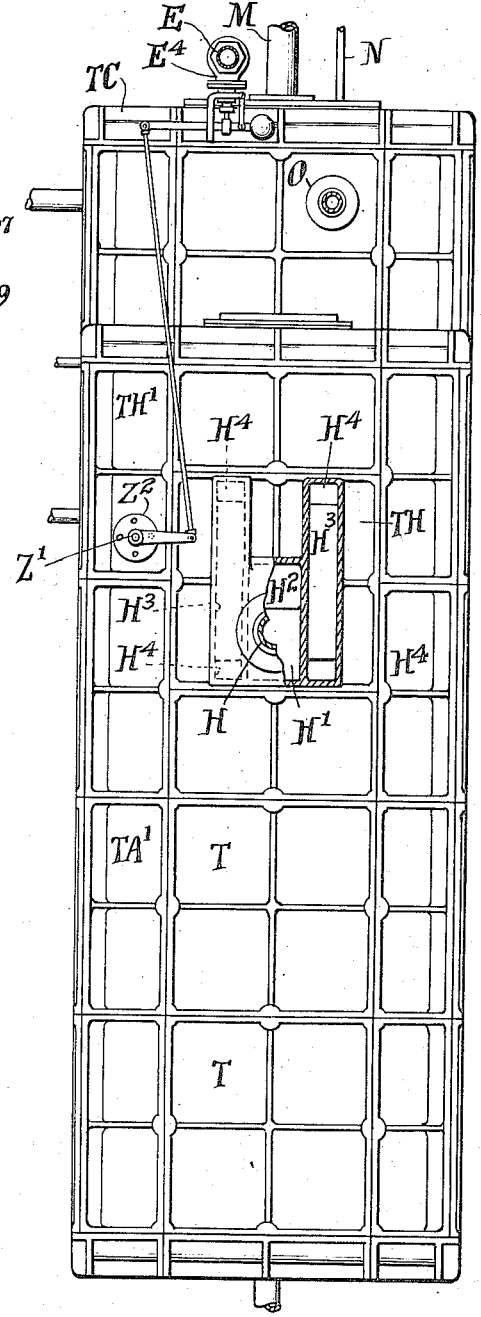

J. W. GAMBLE.
TANK CONSTRUCTION.
APPLICATION FILED MAR. 19, 1912.
1,127,226.
Patented Feb. 2, 1915.
5 SHEETS—SHEET 3.
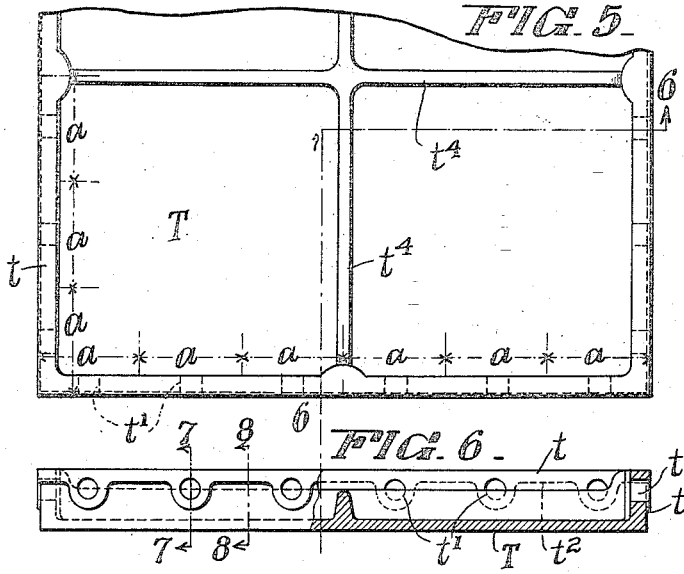
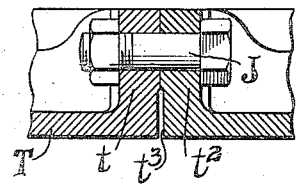
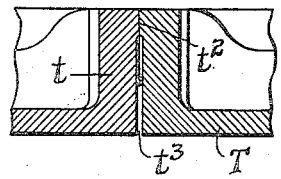
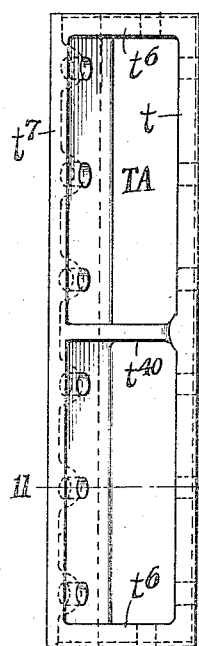
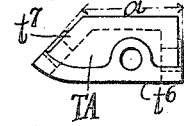
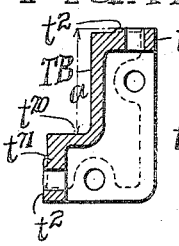
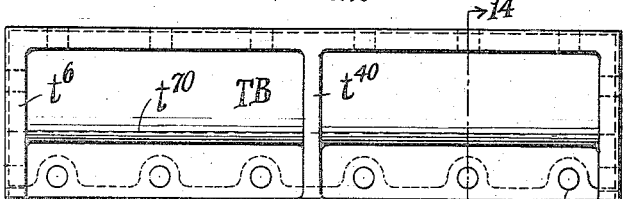
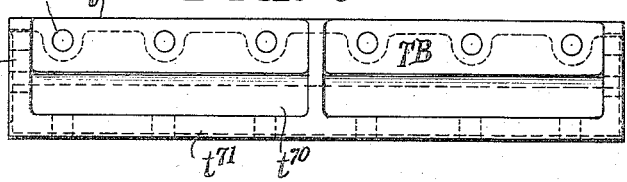
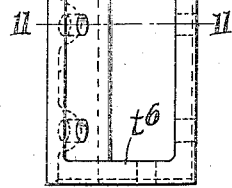
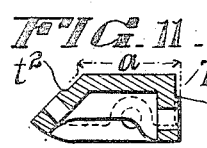
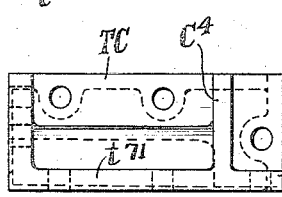
WITNESSES
INVENTOR
BY
ATTORNEY J. W. GAMBLE.
TANK CONSTRUCTION.
APPLICATION FILED MAR. 19, 1912.
1,127,226.
Patented Feb. 2, 1915.
5 SHEETS—SHEET 4.
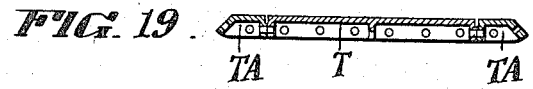
FIG. 19.
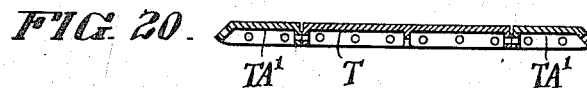
FIG. 20.
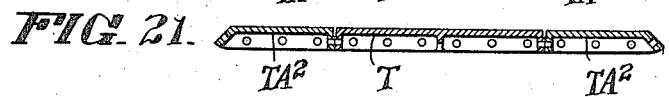
FIG. 21.
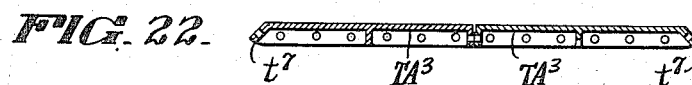
FIG. 22.
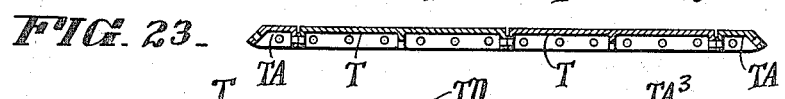
FIG. 23.
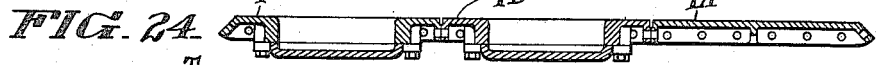
FIG. 24.
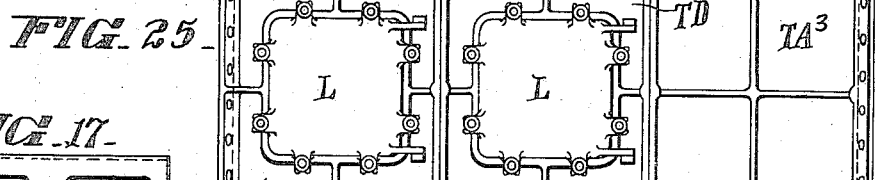
FIG. 25.
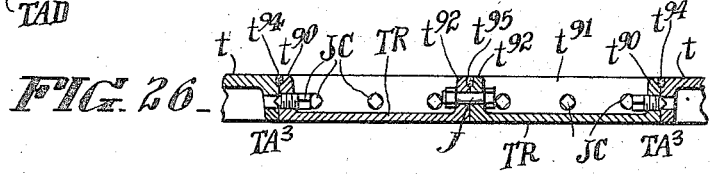
FIG. 26.
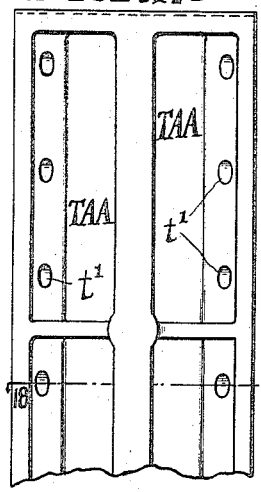
FIG. 17.
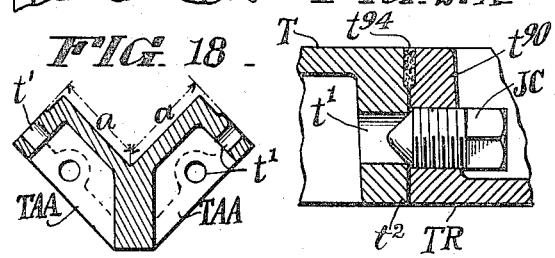
FIG. 18. FIG. 27-A.
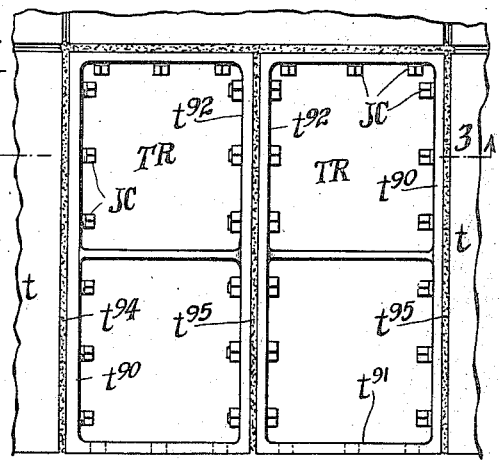
FIG. 27.
WITNESSES
INVENTOR
Joseph W. Gamble
BY
ATTORNEY

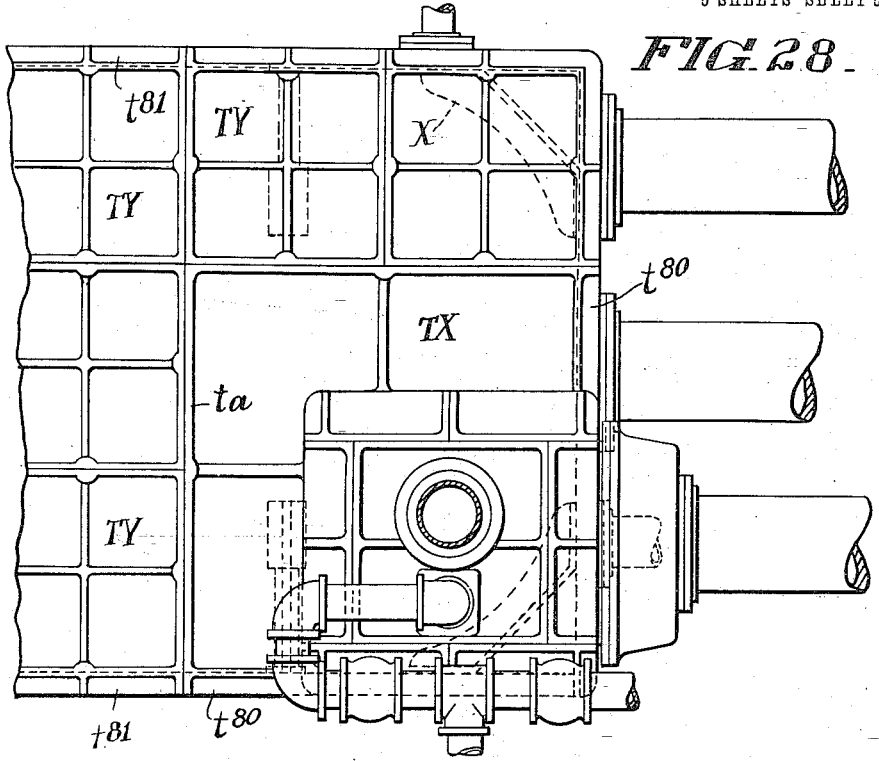
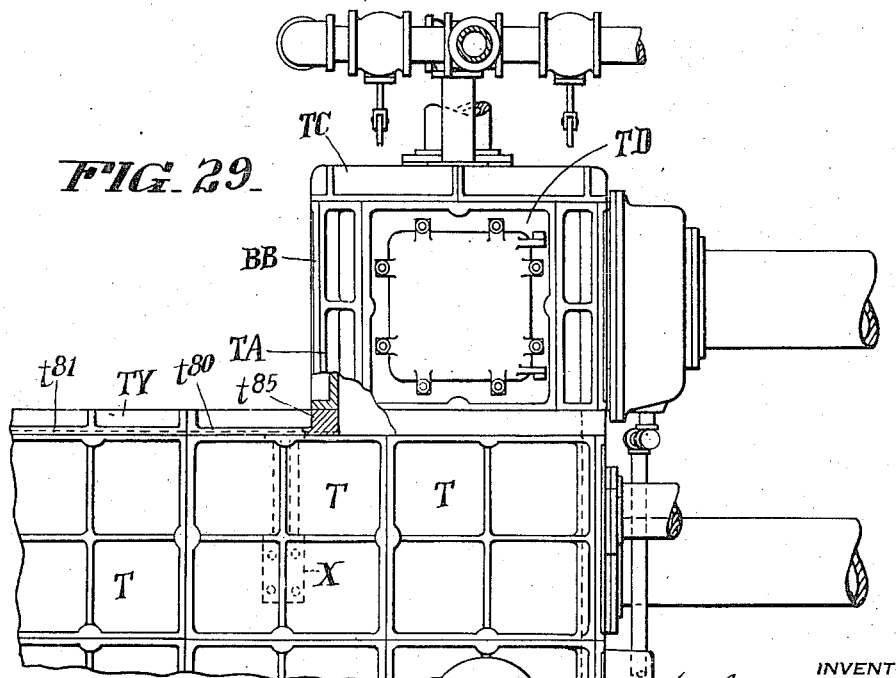

UNITED STATES PATENT OFFICE.

JOSEPH W. GAMBLE, OF PHILADELPHIA, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS AS FIRM OF HARRISON SAFETY BOILER WORKS.

TANK CONSTRUCTION.

1,127,226.      Specification of Letters Patent.      Patented Feb. 2, 1915.

Application filed March 19, 1912. Serial No. 684,785.

*To all whom it may concern:*

Be it known that I, JOSEPH W. GAMBLE, a citizen of the United States, residing in the city and county of Philadelphia, in the State of Pennsylvania, have invented a certain new and useful Improvement in Tank Construction, of which the following is a true and exact description, reference being had to the accompanying drawings, which form a part thereof.

My present invention relates to tanks such as are employed in the so-called open feed water heaters and purifiers, and the primary object of the invention is to simplify the manufacture of and reduce the cost of manufacturing a line of such tanks, including tanks of various styles and sizes. This I accomplish by forming the different tanks out of metal sections which are so shaped and arranged that they may be readily assembled and secured together in various combinations to produce the different sizes and styles of tanks desired.

In the practical carrying out of my invention I so form the various sections that the molding, casting and machining operations may be readily and inexpensively carried out while at the same time the desired mechanical strength and tightness of joints may be obtained in the assembled tanks, and I so correlate the various sections as to obtain a desirable flexibility and range in the styles and sizes of tanks which may be produced from a comparatively small number of sections of standard form kept in stock, with or without the use of additional sections peculiar to sizes and styles of tanks for which there may be only occasional demand. Aside from the general features of my invention to which I have referred, the invention includes special features of construction and arrangement adapted to insure ready assembling, and repairs when necessary to obviate leaking joints and replace broken sections.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described forms of apparatus embodying my invention.

Of the drawings, Figure 1 is a plan view partly broken away and in section, of a water heater and purifier having its tank wall constructed in accordance with the present invention. Fig. 2 is an elevation partly broken away and in section of the structure of Fig. 1. Figs. 3 and 4 are front and rear views, respectively, partly broken away and in section of the structure shown in Figs. 1 and 2. Fig. 5 is an elevation of a portion of one of the sections employed in the tank shown in Figs. 1 to 4. Fig. 6 is an elevation partly in section on the line 6—6 of Fig. 5 of the sections shown in the latter figure. Fig. 7 is a partial section through the section shown in Fig. 5 and an adjacent section, the section being taken on the line 7—7 of Fig. 6. Fig. 8 is a partial section, similar to Fig. 7, taken on the line 8—8 of Fig. 6. Fig. 9 is a side elevation of another form of section employed in the tank shown in Figs. 1 to 4. Fig. 10 is an end elevation of the section shown in Fig. 9. Fig. 11 is a section on the line 11—11 of Fig. 9. Fig. 12 is a plan view of a third section employed in the tank shown in Figs. 1 to 4. Fig. 13 is a side elevation of the section shown in Fig. 12. Fig. 14 is a section on the line 14—14 of Fig. 12. Fig. 15 is a plan view of a fourth form of section employed in the tank shown in Figs. 1 to 4. Fig. 16 is an elevation of the section shown in Fig. 15. Fig. 17 is an elevation of a modification of the section shown in Fig. 9. Fig. 18 is a section on the line 18—18 of Fig. 17. Figs. 19 to 24 are sectional plans illustrating different ways in which sections may be combined to produce tank walls of different dimensions. Fig. 25 is a partial elevation of a tank embodying the arrangement of sections illustrated diagrammatically in Fig. 24. Fig. 26 is a partial sectional elevation, and Fig. 27 a plan of a portion of a tank wall illustrating one way in which damaged sections may be replaced in a tank. Fig. 27ᴬ is a partial section taken similarly to Fig. 26 on a larger scale than Fig. 26. Fig. 28 is a partial plan of still another form of heater tank, and Fig. 29 is a partial elevation of the tank shown in Fig. 25.

The apparatus shown in Figs. 1 to 4 comprises a shell A of rectangular outline having a cupola-like extension B at its top in which are mounted guides B' for perforated baffles or trays B² over which the water to be heated flows in film-like and broken streams. In the body of the shell is mounted a filter bed C which is supported at one end by the partition member D. The latter causes the water passing off the trays B² to pass into the filter bed from the underside of the latter.

E represents the water inlet pipe; F, represents a combined steam inlet and oil separator casing; G, represents the overflow pipe; H, represents the hotwater discharge pipe, and I represents a blow-off connection opening from the lower end of the heater and connected to the overflow or waste connection G.

In so far as above described, the structure shown does not differ from the so-called open feed water heaters and purifiers of a type now in common use.

The shell of the heater constructed is made up of cast iron sections T, T', TA, TA', TB, TB', TC, TD, TE, TF, TG, TH and TI connected together as by bolts. These sections differ from one another in form or dimensions but possess certain similarities in construction and dimensions which permit them to be assembled as shown in Figs. 1 to 4, and also in other ways as hereinafter explained.

Each section T, as shown best in Figs. 5 and 6, is square and comprises a flat plate-like body having a marginal flange $t$ formed with the bolt holes $t'$ for the bolts J by means of which the section is secured to adjoining sections in the assembled structure. To simplify the drawings and avoid confusion I have omitted all showing of the bolts J for the most part in the smaller scale drawings. The flange $t$ is provided at its outer side with a smooth bearing surface $t^2$ which ordinarily is machined and preferably, as shown, does not extend to the inner face of the plate so that a space $t^3$ is provided between adjacent sections T as shown in Figs. 7 and 8. This reduces machining and facilitates calking when necessary. Preferably, the sections T are provided with stiffening ribs $t^4$ meeting at the center of the section. As shown each section T is formed with a semi-cylindrical boss $t^5$ at the junction of each rib $t^4$ with the marginal flange $t$. The cylindrical bosses formed by the registering bosses $t^5$ of adjacent sections may be bored out to receive staybolt or other connections to the tank walls. In Fig. 2 three staybolts JA are shown as so connected into the tank wall and a pipe connection X is also connected into the wall in this manner.

The bolt holes $t'$ are formed in the flange $t$ of each section T at regular intervals along the length of the latter. As shown in Fig. 5 these bolt holes are formed one at the middle of each of the six units $a$ of length into which each side of the section T may be divided. Each section T' differs from a section T primarily in being only one-half as wide as the latter, and in the omission of one pair of the ribs $t^4$ which the decrease in width makes unnecessary.

Each of the sections TA differs from the section T in that the flange $t^7$ at one edge of the plate-like body of the section TA is inclined at an angle of 45° to the plane of the body of the section. Aside from this inclination the flange $t^7$ is like the flanges $t$. For convenience of reference the flanges connecting the flanges $t^7$ and $t$ of each section TA are designated by the symbol $t^6$, although the flanges $t^6$ need not differ in any respect except length from the flanges $t$ of the sections T and TA. As shown, each section TA is provided with a single stiffening rib $t^{40}$. Each section TA, in the construction shown in the drawings, is equal in length to one side of a section T but the width of the inner wall forming surface proper of each section TA, is equal to one unit $a$.

The sections TA' differ from the sections TA in the width of their wall forming portions, this portion in each section TA', as shown, being equal to two units $a$.

The sections TB differ from sections TA in that a portion $t^{70}$ of the body of each section TB is bent at right angles to the remainder of the body, and is provided at its edge with a transverse flange $t^{71}$ which is perpendicular to the flange $t$ of the section. The flange $t^{71}$ is provided with a joint forming surface $t^2$ similar to the joint forming surfaces $t^2$ of the flange $t$. The section TB' differs from the section TB merely in the width of the inner wall forming portion of the section lying between the flange $t$ and the off-set portion $t^{70}$, this width being equal to one unit $a$ in each section TB, and equal to two units $a$ in each section TB'.

The sections TC differ from the sections TB' in that each section TC extends beyond the stiffening rib $t^{40}$ at one side only far enough to provide an end flange $t^{72}$ parallel to the body of the section and similar to the side flange $t^{71}$. The length of the inner wall forming surface proper of each section TC measured parallel to its flange $t$ is, as shown, equal to two units $a$.

The sections TD differ from the sections T in the omission of the stiffening ribs $t^4$, and in being formed each with a door or manhole opening surrounded by an external flange $t^{11}$ against which a door L may be detachably secured to the section by bolts L'. These door sections are provided wherever necessary to permit of cleaning, inspection or repairs. In particular one of these door sections is ordinarily placed in front of each set of trays $B^2$ with which the heater may be provided. In Fig. 2 the door L for the door section TD in front of the trays $B^2$ is removed, thus exposing the flange $t^{11}$.

The section TE employed in the top of the cupola extension differs from the sections T mainly in that portions of the stiffening ribs $t^4$ are replaced by bosses $E'$, $E^2$ and $E^3$ to which pipe connections are made. As shown the cold water supply pipe E is tapped into the boss $E'$, a vent pipe M for uncondensed steam and vapors is tapped into the boss $E^2$, and a pipe N for supplying a chemical purifying reagent is tapped into the boss $E^3$.

The steam inlet section TF is in two parts of which the inner part forms a part of the tank wall proper. The inner part of the section TF is in the form of a box with its outer walls abutting against and bolted to the flanges $t$ and $t^{70}$ of the adjacent sections $T'$, TA and $TB'$, the securing bolts in this case extending into the interior of the section TF. As shown also, the section TF supports a valve seat member FA having a steam inlet port $F^{10}$ controlled by an oscillating valve member $F^6$ which has an operating shaft $F^7$ extending through a boss $F^8$ formed in the side of the section F. $F^9$ represents an operating handle secured to the external end of the shaft $F^3$. Advantageously as shown the section TF is provided with a boss $F^4$ at each side so that the valve shaft $F^7$ may project at either side as conditions make desirable. Only one of these bosses need be bored out though if both are bored out the one not in use may be blanked up.

The section TG is provided with a marginal flange $t$ similar in size and form to the flange $t$ of the sections T except that portions merge into the end walls of a chamber $G'$ containing a baffle comprising vertical portions $G^2$ and $G^{20}$, and a lower horizontal portion $G^{21}$ for providing a water sealed channel between the waste pipe G and the port $G^3$ opening to the interior of the tank. Some of the bolts (not shown in Figs. 2 and 3 because of the small scale of these figures) by which the section TG is secured to the wall sections above and below it may extend into the interior of the chamber $G'$.

The section TH has a marginal flange $t$ similar in form and size to the flange $t$ of the sections T, except that portions merge into the end walls of channels $H^2$ and a chamber $H'$. The pipe H is directly connected to the interior of the tank above the filter bed $c$ through the chamber $H'$. The channels $H^2$ coöperate with the baffle A to form a by-pass through which the pipe H may be supplied with water when the filter bed becomes clogged.

The section TI resembles the sections TB but the width of the inner wall forming portion measured parallel to its flanges $t^6$ is equal to four units $a$, and the section is provided with two stiffening ribs $t^{41}$ parallel to its flanges $t$. The section TI is also provided with a flanged boss to which the blow-off valve I is connected. Apertures may be formed in the flat plate-like bodies of sections forming the wall of the tank A wherever required. For instance an aperture is formed in one of the sections $TA'$ to receive the shaft $Z'$ through which a float Z within the heater operates the controlling valve $E^4$ in the cold water supply pipe E. Advantageously as shown the plate at the margin of this aperture is strengthened by having a pad $Z^2$ bolted to it. O and $O'$ represent similar pads secured to other sections of the tank wall at the margin of apertures provided for various purposes.

In the particular construction shown in Figs. 1 to 4, the top wall of the body of the tank A immediately adjacent the cupola extension is formed by sections $TB'$ and TC which have their flanges $t^{70}$ bolted directly to the flanged head of the partition member D. Similarly the section T and the two sections $TA'$ forming the adjacent vertical wall of the cupola extension have their lower flanges $t$ and $t^6$ bolted to the flanged head of the partition member D.

The bottom wall of the tank is formed like the portion of the top wall of the tank to the right of the cupola extension as seen in Fig. 4, except that the bottom wall ordinarily contains no door section TD.

In the tank construction shown in Figs. 1 to 4 it will be apparent that the sections TA, $TA'$, TB, $TB'$ and TC form what may be called corner sections and that the bodies of the flat walls of the tank are formed by the plain body sections T and $T'$, and by the special accessory sections, including the door sections TD and the sections TE, TF, TG, TH and TI. The relative arrangement of these special or accessory sections with respect to each other and to the other sections forming the bodies of the tank walls, and indeed the use or omission of some or all of them and the use of other special accessory sections, depend upon the style and character of the tank to be constructed.

Another example of a special section and one for which there may be rather frequent demand is illustrated in Figs. 28 and 29 in which there is a heater having a cupola-like extension BB receiving heating trays. This extension is mounted on a special section TX having an inner wall forming portion of the standard section. The section TX is provided with transverse flanges $t$ at two sides adapted to register with the flanges $t$ of a standard section T and special upper sections TY employed in the top wall of the heater tank shown in Figs. 28 and 29. At its other two sides the section TX is provided at the sides of the cupola BB with extensions $t^{80}$ beyond the margin of the wall forming portion proper of the section. These sections are parallel to the body of the section and are adapted to be secured to the flanges $t$ of the adjacent sections of the side and end walls of the heater. To support the cupola BB, the section TX is formed with a hollow boss $t^{85}$ having an upper joint forming surface adapted to register with the joint forming surfaces $t^2$ of the lower flanges of the various sections forming the cupola BB which are secured thereto as by stud bolts JB. The under edge of the boss $t^{85}$ at the margin of the heater is similarly connected to the side walls of the tank.

In the construction shown in Figs. 28 and 29 the sections TY forming the marginal portions of the top wall of the tank body are formed with extensions $t^{81}$ similar to the extensions $t^{80}$ of the section TX. In the heaters shown in Figs. 28 and 29 I have illustrated the use of corner stays X having end portions X' adapted to abut against and be bolted to the intersecting walls of the heater body meeting at an angle.

With the various sections formed as described and with the holes $t'$ for the fastening bolts J spaced as described it will be apparent to those skilled in the art that the special and standard sections may be assembled in any desired relative arrangement. For instance it is quite immaterial whether each of these sections meets the corners of three other sections, or whether the sections in adjacent rows break joints, or whether the main body sections in one flat wall have their top and bottom edges at the same levels as corresponding sections in other walls of the same heater. The flanges of the various corner sections which abut against the flanges $t$ of the main sections must of course match therewith and have their bolt holes $t'$ correspondingly spaced. It is not essential, however, in order to obtain some of the advantages of the invention that the flanges $t^6$ of the corner sections TA, TB, TC, etc., should be arranged to match with the flanges $t$ of the various sections or that the width of the inner wall forming surfaces of these sections should be integral multiples of the common unit $a$, since these corner sections in general have their flanges $t^6$ assembled only in contact with the flanges $t^6$ of other corner sections. It is advantageous, however, to make the flanges $t^6$ match with the flanges $t$ since a somewhat greater flexibility in combining parts is obtained thereby, and the manufacture of the different sections is simplified by uniformity in spacing. Moreover, the spacing of the bolt holes $t'$ employed in the flanges $t$ is such as to give good results in assembling the sections T, and will give good results in assembling the corner sections.

The spacing of the bolt holes $t'$ in the flanges $t$, that is the length of the unit $a$ is fixed by the fact that there must be enough bolts to give the desired mechanical strength and to minimize leaking on the one hand, while on the other hand it is, in general, desirable to have the bolts in each flange portion far enough away from a transverse flange portion or stiffening rib to make it easy to secure the bolts in place, and it is of course desirable to keep the number of bolts as small as possible. The limitations fixed by the foregoing considerations on the spacing of the bolt holes which may be employed, permit of a considerable range in the length of the unit $a$. This length is preferably chosen, however, to permit of a desirable flexibility in the increments by which the dimensions of a tank formed of the sections may be varied. In the practical use of the invention I have obtained satisfactory results by making the length of this unit $a$ equal to four inches. By doing this it is possible to vary the dimensions of a tank and thereby its capacity by increments of four inches, though, in general, I find it satisfactory to vary the dimensions of the tank by increments of eight inches. In general, to obtain the side of a tank wall of given width I employ the maximum number of what I may call full sized sections which, with the construction shown, and assuming a unit $a$ equal to four inches are sections two feet square each and then employ corner sections to complete the desired width, and it is because I prefer ordinarily to employ similar corner sections at the opposite edges of each side wall that I ordinarily vary the width of the wall by increments equal to two $a$ or eight inches rather than by increments of four inches, each. Various ways in which sections such as those described may be employed to form walls of varying widths are shown quite clearly in Figs. 19 to 25 inclusive which require no explanation except to point out that the section $TA^2$, differs from the sections TA only in the width of the inner wall forming surface portions which in each section $TA^2$ is equal to three $a$ or twelve inches, with the side of the unit referred to above, and that the section $TA^3$ differs from the section T only in having one inclined flange $t^7$ like the flange $t^7$ of the sections TA, and that the section TAD, (see Figs. 24 and 25) is a door section differing from the sections $TA^3$ as the sections TD differ from the sections T.

The modified corner section TAA shown in Figs. 17 and 18 is adapted to take the place of two corner sections TA, differing from an assembled pair of such sections in that the portion corresponding to the two beveled flanges $t^7$ of the pair of sections TA are in one piece.

It will be readily understood by those skilled in the art that a heater tank formed of sections in the manner described may be readily assembled, and the character of the joint forming surfaces $t^2$ is such as to require a minimum of machining while insuring tight joints without the necessity for calking the joints in many cases. In assembling the sections the joint forming surfaces are coated with red lead or a like composition to avoid leakage. It is one of the advantages of the invention that the character of a tank constructed in this manner may be readily changed without taking it entirely apart. For instance, to change an assembled tank of one style into a tank of another style, as is frequently desirable, it is only necessary in many cases to remove one or more special sections and to substitute other special sections therefor. Furthermore, it is apparent that the capacity of a tank may be varied by simply taking the tank apart and inserting or removing a row or rows of intermediate sections.

In case of injury to any section of an assembled tank it is ordinarily an easy matter to remove the injured section and replace it by a new section. In some cases, however, as when the injured section is the bottom wall of the tank, or is in a portion of the side or top wall if the tank is in close proximity to the wall of the building in which the heater may be installed or to other apparatus, the section to be removed is not readily accessible from the outside of the tank. To take care of such cases I have devised a special section which may be put in place from the inside of the heater after the old damaged section has been broken out and the bolts I' which secured it in place are removed. One example of such a repair section is shown in Figs. 26 27 and 27A wherein the repair section adapted to take the place of a standard section T is formed in two similar parts TR, this division being necessary to permit the section to be passed into the heater through the opening in a standard door section TD. Each of the parts TR into which the repair section is divided, comprises a side flange $t^{90}$ and end flanges $t^{91}$ adapted to abut against the flanges $t$ of the adjacent wall sections. In the case of the repair section TR, however, the flanges extend inwardly and not outwardly from the body portion of the section and the body portion of the section, as shown, is substantially flush with the outer edges of the flanges of the adjacent standard sections. Each part TR is provided at the side adjacent the other half with a flange $t^{92}$ provided with a joint forming surface adapted to be clamped against the corresponding joint forming surface of the abutting flange $t^{92}$ by bolts J. Bolt holes are tapped in the flanges $t^{90}$ and $t^{91}$ to register with the bolt holes $t'$ in the flanges $t$ of the adjacent standard sections, and bolts JA with conical ends are screwed into these tapped ends and extend into the bolt holes $t'$ of the flanges $t$ of the adjacent section. These bolts serve to correctly position the repair parts TR in the wall of which they form a part but are not relied upon to clamp the parts together and thereby secure tight joints. Leakage at the joints between the repair parts TR and the adjacent sections is prevented by filling the grooves $t^{94}$ with suitable calking material. Preferably also, a channel $t^{95}$ to be filled with calking material, is provided between the flanges $t^{92}$, as with the cramped space conditions under which these parts must be put in place, it is difficult to obtain tight joints by means of clamping bolts. While, as I have before said, calking is not usually necessary in order to secure tight joints between the regular sections of the tank wall it is apparent that all of the joints may be readily calked from within the heater when this is necessary, except in the case of such a construction as that shown in Figs. 28 and 29 wherein the joints formed in part by the extensions $t^{80}$ and $t^{81}$ of the sections TX and TY are so disposed as to make internal calking difficult.

It will be apparent that the character of the sections and particularly of what I may call standard sections as distinguished from special sections is such as to make these sections exceedingly easy to cast and to facilitate such machining operations as it is necessary to give them.

While in accordance with the provisions of the statutes I have illustrated and described the best forms of my invention now known to me it will be apparent to those skilled in the art that changes may be made in the form of the apparatus disclosed without departing from the spirit of my invention, and that under some conditions certain features of my invention may be used with advantage without a corresponding use of other features.

Having now described my invention what I claim as new and desire to secure by Letters Patent is:

1. A metal section adapted to be assembled with similar sections to form a tank wall, and comprising a rectangular body portion and a marginal flange transverse thereto and formed with a raised bearing surface of less width than the flange proper running longitudinally of the flange on the outer side thereof adjacent one edge of the flanged and formed with bolt holes extending through said flange and opening at the other side thereof through said bearing face, whereby when said flange is secured against the flange of a similar section by bolts passing through said bolt holes, a calking space, closed at one edge by the abutting bearing surfaces, is provided between the connected flanges.

2. A metal section adapted to be assembled with similar sections to form a tank wall, and comprising a rectangular body portion and a marginal flange transverse thereto and formed with a raised bearing surface of less width than the flange proper running longitudinally of the flange on the outer side thereof adjacent one edge of the flange and formed with bolt holes extending through said flange and opening at the other side thereof through said bearing face the latter being widened at each bolt hole, whereby when said flange is secured against the flange of a similar section by bolts passing through said bolt holes, a calking space, closed at one edge by the abutting bearing surfaces, is provided between the connected flanges.

3. In combination with a tank wall formed of sections having external marginal flanges and having adjacent sections secured together by bolts passing through bolt holes formed in the abutting marginal flanges, of a repair section adapted to be inserted in said walls from the inside to replace a damaged section and having an internal marginal flange, and bolts threaded through the internal flange and adapted to engage the flanges of the adjacent sections.

4. In combination with a tank wall formed of sections having external marginal flanges and having adjacent sections secured together by bolts passing through bolt holes formed in the abutting marginal flanges, of a repair section adapted to be inserted in said walls from the inside to replace a damaged section and having an internal marginal flange, and bolts threaded through an internal flange and adapted to engage the flanges of the adjacent sections, said repair section being divided into parts with internal flanges at the joint between the parts and bolts passing through the last mentioned flanges to secure said joints together.

5. In combination with a tank wall formed of sections having external marginal flanges and having adjacent sections secured together by bolts passing through bolt holes formed in the abutting marginal flanges, of a repair section adapted to be inserted in said walls from the inside to replace a damaged section and having an internal marginal flange, and bolts threaded through said internal flange and adapted to enter the bolt holes in the flanges of the adjacent sections.

6. In combination with a tank wall formed of sections having external marginal flanges and having adjacent sections secured together by bolts passing through bolt holes formed in the abutting marginal flanges, of a repair section adapted to be inserted in said walls from the inside to replace a damaged section and having an internal marginal flange and bolts of larger diameter than said bolt holes and having conical ends threaded through said internal flange and in register with the bolt holes in the flanges of the adjacent sections.

7. In combination with a tank wall formed of sections having external marginal flanges and having adjacent sections secured together by bolts passing through bolt holes formed in the abutting marginal flanges, of a repair section adapted to be inserted in said walls from the inside to replace a damaged section and having an internal marginal flange, and bolts threaded through an internal flange and adapted to engage the flanges of the adjacent sections, said internal flanges being shaped to provide a space for calking material between its inner edge and the adjacent flanges of the adjacent sections.

JOSEPH W. GAMBLE.

Witnesses:
ROBERT G. CLIFTON,
JESSE E. HARRIS.